(12) United States Patent
Braidwood et al.

(10) Patent No.: US 7,638,566 B2
(45) Date of Patent: Dec. 29, 2009

(54) POLY(ARYLENE ETHER) COMPOSITIONS

(75) Inventors: Christina Louise Braidwood, Niskayuna, NY (US); Amy R. Freshour, Putte (NL); Hua Guo, Selkirk, NY (US); Edward N. Peters, Lenox, MA (US)

(73) Assignee: Sabic Innovative Plastics IP B.V. (NL)

( * ) Notice: Subject to any disclaimer, the term of this patent is extended or adjusted under 35 U.S.C. 154(b) by 476 days.

(21) Appl. No.: 11/554,246

(22) Filed: Oct. 30, 2006

(65) Prior Publication Data

US 2008/0103238 A1 May 1, 2008

(51) Int. Cl.
*C08G 18/08* (2006.01)
(52) U.S. Cl. .................. 524/205; 524/242; 524/243; 524/356; 524/366
(58) Field of Classification Search .............. 524/205, 524/242, 243, 356, 366
See application file for complete search history.

(56) References Cited

U.S. PATENT DOCUMENTS

| | | | |
|---|---|---|---|
| 3,496,236 A | 2/1970 | Cooper et al. | |
| 4,156,772 A | 5/1979 | Loucks et al. | |
| 4,665,137 A | 5/1987 | Percec | |
| 4,769,423 A | 9/1988 | Risse et al. | |
| 4,837,276 A | 6/1989 | Fuhr et al. | |
| 5,021,543 A | 6/1991 | Mayska et al. | |
| 5,880,221 A | 3/1999 | Liska et al. | |
| 2006/0041086 A1 | 2/2006 | Birsak et al. | |

FOREIGN PATENT DOCUMENTS

| | | |
|---|---|---|
| EP | 215257 A1 | 3/1987 |
| WO | 0060002 | 10/2000 |

OTHER PUBLICATIONS

International Search Report; International Application No. PCT/US2007/071453; International Filing Date: Jun. 18, 2007; (Earliest) Priority Date: Oct. 30, 2006; File Reference No. 218633-1; 5 pages.
Written Opinion of the International Searching Authority; International Application No. PCT/US2007/071453; International Filing Date:Jun. 18, 2007; (Earliest) Priority Date: Oct. 30, 2006; File Reference No. 218633-1; 5 pages.
Dwain M. White, "Reactions of Poly(phenylene Oxide)s with Quinones. I. The Quinone-Coupling Reaction Between Low-Molecular-Weight Poly(2,6-Dimethyl-1,4-Phenylene Oxide) and 3,3',5,5'-Tetramethyl-4,4'-Diphenoquinone", Journal of Polymer Science: Polymer Chemistry Edition, vol. 19, 1367-1383 (1981).
Dwain M. White, "Polymerization of Oxidative Coupling. II. Co-Redistribution of Poly (2,6-diphenyl-1,4-phenylene Ether) with Phenols", Journal of Polymer Science: Part A-1, vol. 9, 663-675 (1971).
JP06220226A to Katayose et al (Aug. 9, 1994) "Production of Prepreg by Using Polyphenylene Ether" Human Translation (11 pages).

*Primary Examiner*—Edward J Cain
(74) *Attorney, Agent, or Firm*—Cantor Colburn LLP

(57) ABSTRACT

A composition includes at least 15 weight percent of a low intrinsic viscosity, bifunctional poly(arylene ether) and at least 20 weight percent of a nonhalogenated solvent. The bifunctional poly(arylene ether)s are substantially and unexpectedly more soluble than their monofunctional analogs. The compositions are useful as concentrates to add bifunctional poly(arylene ether)s to thermosets.

42 Claims, No Drawings

POLY(ARYLENE ETHER) COMPOSITIONS

BACKGROUND OF THE INVENTION

Thermoset resins are materials that cure to form very hard plastics. These materials that can be used in a wide variety of consumer and industrial products. For example, thermosets are used in protective coatings, adhesives, electronic laminates (such as those used in the fabrication of computer circuit boards), flooring and paving applications, glass fiber-reinforced pipes, and automotive parts (including leaf springs, pumps, and electrical components). Relative to other types of plastics, cured thermosets are typically brittle. It would therefore be desirable to retain the good properties of thermosets and also reduce their brittleness.

Poly(arylene ether) resins, sometimes called polyphenylene ethers, have been disclosed as additives to reduce the brittleness (improve the toughness) of cured thermosets. For example, it is known to combine certain poly(arylene ether) resins with thermosets resins such as epoxies, cyanate esters, maleimides, acrylates, and benzoxazine resins. These poly (arylene ether)-containing compositions are often processed in solvents to reduce the viscosity of the curable composition and to enhance impregnation of the curable composition into fillers and/or reinforcements. When a solvent is used, it would be preferable to use a non-chlorinated hydrocarbon solvent. However, non-chlorinated hydrocarbon solvents such as N-methyl-2-pyrrolidone (NMP) and methyl ethyl ketone (MEK) are not ideal for this purpose because they produce phase-separated mixtures with most poly(2,6-dimethyl-1,4-phenylene ether)s at room temperature. Improvements in the miscibility of poly(arylene ether)s and solvents have been obtained by processing curable compositions containing them at elevated temperatures as described, for example, in Japanese Patent Application Publication No. JP 06-220226A of Katayose et al. However, it would be desirable to avoid the use of elevated temperatures because they are associated with increased solvent flammability, increased solvent emissions, and increased energy costs. It would also be desirable to have concentrated solutions of poly(arylene ether)s so that higher concentrations of dissolved poly(arylene ether) could be added to a thermoset composition without also adding large amounts of solvent to the composition. Furthermore, in order to facilitate distribution of poly(arylene ether) solutions via truck and rail, it would be desirable to have concentrated solutions of poly(arylene ether)s that can withstand exposure to freezing and sub-freezing temperatures without forming precipitates. There is therefore a need to develop materials and methods for providing solutions in which high concentrations of poly(arylene ether) are soluble at and below room temperature in non-halogenated solvents such as NMP and MEK.

BRIEF DESCRIPTION OF THE INVENTION

The above-described and other drawbacks are alleviated by a composition, comprising: at least 15 weight percent of a bifunctional poly(arylene ether) having an intrinsic viscosity of about 0.03 to 0.12 deciliter per gram measured in chloroform at 25° C.; wherein the bifunctional poly(arylene ether) has the structure

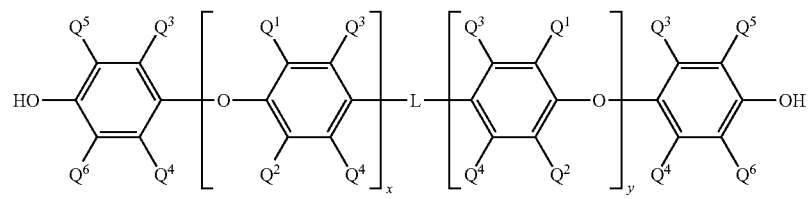

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30 with the proviso that the sum of x and y is at least 2; and L has the structure

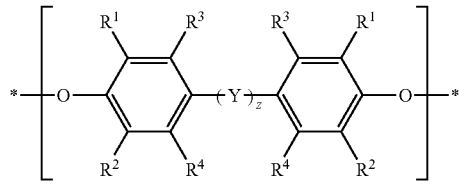

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

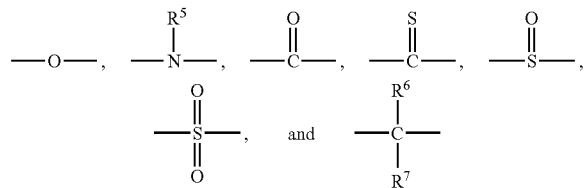

wherein each occurrence of R⁵ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and at least 20 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof; wherein the bifunctional poly(arylene ether) has a solubility in the composition of at least 100 grams per kilogram of composition at 23° C.; wherein the composition is substantially free of $C_1$-$C_6$ alkanols, alkali metal ions, and metal ions effective for the catalysis of oxidative polymerization of phenols; and wherein all weight percents are based on the total weight of the composition.

Another embodiment is a composition, consisting of: 15 to about 80 weight percent of a bifunctional poly(arylene ether) having an intrinsic viscosity of about 0.03 to 0.12 deciliter per gram measured in chloroform at 25° C.; wherein the bifunctional poly(arylene ether) has the structure

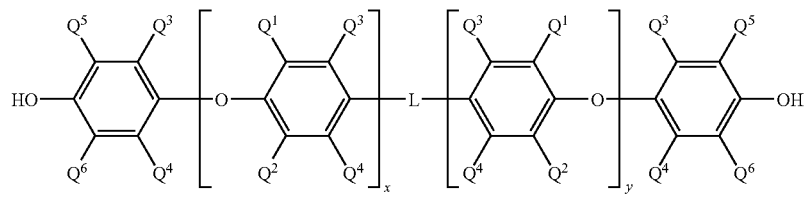

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30 with the proviso that the sum of x and y is at least 2; and L has the structure

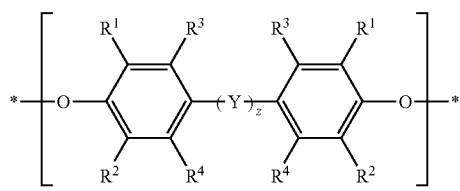

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

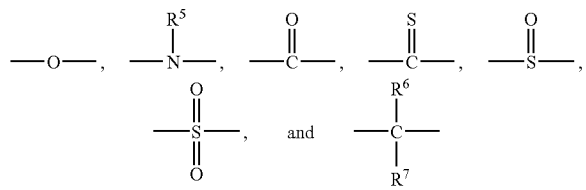

wherein each occurrence of R⁵ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and about 20 to 85 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof; wherein the bifunctional poly(arylene ether) has a solubility in the composition of at least 100 grams per kilogram of composition at 23° C.; wherein the composition is substantially free of $C_1$-$C_6$ alkanols, alkali metal ions, and metal ions effective for the catalysis of oxidative polymerization of phenols; and wherein all weight percents are based on the total weight of the composition.

Another embodiment is a composition, comprising: about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

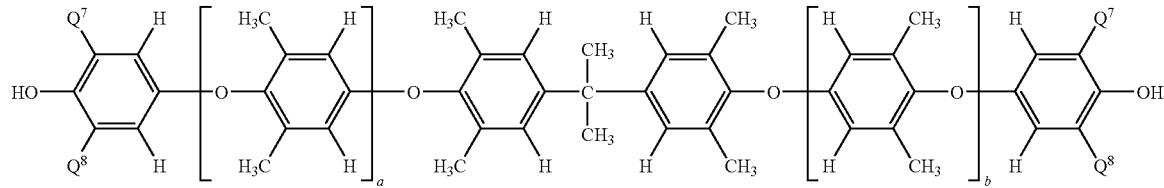

wherein each occurrence of $Q^7$ and $Q^8$ is independently methyl or di-n-butylaminomethyl; and each occurrence of a and b is independently 1 to about 20, with the proviso that the sum of a and b is at least 2; and about 40 to about 70 weight percent of a solvent selected from the group consisting of methyl ethyl ketone, methyl isobutyl ketone, N,N-dimethylformamide, N-methylpyrrolidone, and mixtures thereof; wherein the bifunctional poly(arylene ether) is soluble in the composition at 23° C. for seven days; and wherein all weight percents are based on the total weight of the composition.

Another embodiment is a composition, consisting of: about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

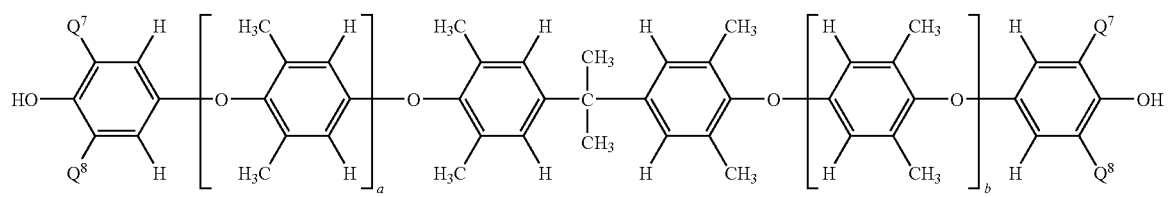

wherein each occurrence of $Q^7$ and $Q^8$ is independently methyl or di-n-butylaminomethyl; and each occurrence of a and b is independently 1 to about 20, with the proviso that the sum of a and b is at least 2; and about 40 to about 70 weight percent of a solvent selected from the group consisting of methyl ethyl ketone, methyl isobutyl ketone, N,N-dimethylformamide, N-methylpyrrolidone, and mixtures thereof; wherein the bifunctional poly(arylene ether) is soluble in the composition at 23° C. for seven days; and wherein all weight percents are based on the total weight of the composition.

These and other embodiments, including methods of preparing the compositions, are described in detail below.

DETAILED DESCRIPTION OF THE INVENTION

In the course of research on poly(arylene ether)s and their solubility properties, the present inventors have discovered that particular low intrinsic viscosity, bifunctional poly(arylene ether)s exhibit markedly improved solubility in non-halogenated solvents compared to poly(2,6-dimethyl-1,4-phenylene ether)s. In particular, these low intrinsic viscosity, bifunctional poly(arylene ether)s enable the preparation of concentrated solutions at room temperature in non-halogenated solvents. The high solubility of the bifunctional poly(arylene ether)s is particularly unexpected given that their monofunctional analogs have very similar molecular structures but are much less soluble. The compositions eliminate the need to handle poly(arylene ether) solutions at elevated temperature and therefore facilitate the incorporation of poly(arylene ether)s into thermoset compositions.

One embodiment is a composition, comprising: at least 15 weight percent of a bifunctional poly(arylene ether) having an intrinsic viscosity of about 0.03 to 0.12 deciliter per gram measured in chloroform at 25° C.; wherein the bifunctional poly(arylene ether) has the structure

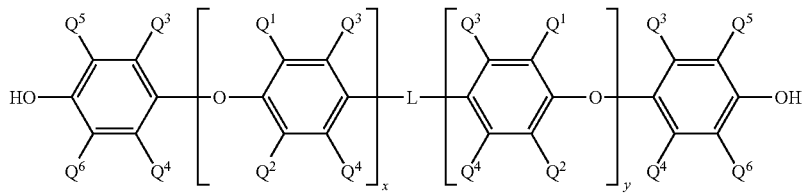

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to about 20, more specifically 0 to about 15, still more specifically 0 to about 10, yet more specifically 0 to about 8; wherein the sum of x and y is at least 2, specifically at least 3, more specifically at least 4; and L has the structure

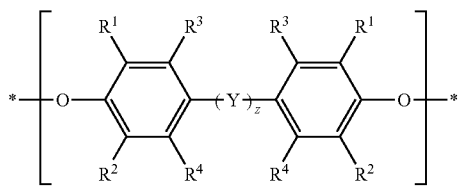

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

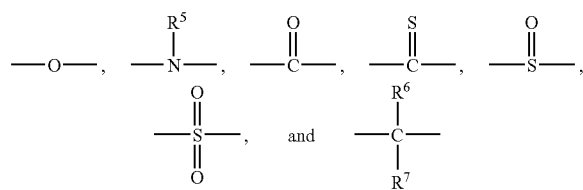

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and at least 20 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof; wherein the bifunctional poly(arylene ether) has a solubility in the composition of at least 100 grams per kilogram of composition at 23° C.; wherein the composition is substantially free of $C_1$-$C_6$ alkanols, alkali metal ions, and metal ions effective for the catalysis of oxidative polymerization of phenols; and wherein all weight percents are based on the total weight of the composition. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl residue may also contain one or more carbonyl groups, amino groups, hydroxyl groups, or the like, or it may contain heteroatoms within the backbone of the hydrocarbyl residue. As one example, $Q^5$ may be a di-n-butylaminomethyl group formed by reaction of a terminal 3,5-dimethyl-1,4-phenyl group with the di-n-butylamine component of an oxidative polymerization catalyst.

The composition comprises a bifunctional poly(arylene ether). With respect to an individual poly(arylene ether) molecule, the term "bifunctional" means that the molecule comprises two phenolic hydroxy groups. With respect to a poly (arylene ether) resin, the term "bifunctional" means that the resin comprises, on average, about 1.6 to about 2.4 phenolic hydroxy groups per poly(arylene ether) molecule. In some embodiments, the bifunctional poly(arylene ether) comprises, on average, about 1.8 to about 2.2 phenolic hydroxy groups per poly(arylene ether) molecule.

In the bifunctional poly(arylene ether) structure above, there are limitations on the variables x and y, which correspond to the number of phenylene ether repeating units at two different places in the bifunctional poly(arylene ether) molecule. In the structure, x and y are independently 0 to about 30, specifically 0 to about 20, more specifically 0 to about 15, even more specifically 0 to about 10, yet more specifically 0 to about 8. The sum of x and y is at least 2, specifically at least 3, more specifically at least 4. A particular bifunctional poly (arylene ether) resin can be analyzed by proton nuclear magnetic resonance spectroscopy ($^1$H NMR) to determine whether these limitations are met for the entire resin, on average. Specifically, $^1$H NMR can distinguish between resonances for protons associated with internal and terminal phenylene ether groups, and internal and terminal residues of a dihydric phenol, as well as other terminal residues. It is therefore possible to determine the average number of phenylene ether repeat units per molecule, and the relative abundance of internal and terminal residues derived from dihydric phenol.

In some embodiments, the bifunctional poly(arylene ether) has the structure

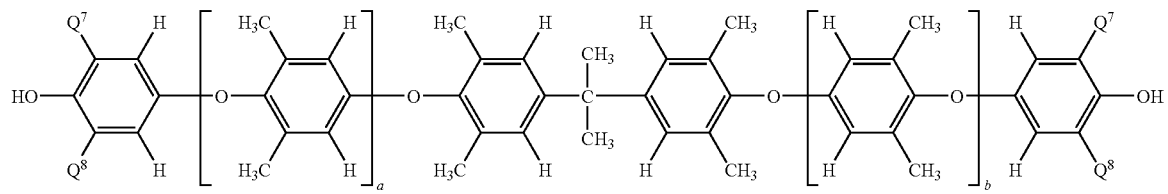

wherein each occurrence of $Q^7$ and $Q^8$ is independently methyl or di-n-butylaminomethyl; and each occurrence of a and b is independently 1 to about 20, with the proviso that the sum of a and b is at least 2, specifically at least 3, more specifically at least 4. Bifunctional poly(arylene ether)s having this structure can be synthesized by oxidative copolymerization of 2,6-xylenol and 2,2-bis(3,5-dimethyl-4-hydroxyphenyl)propane in the presence of a catalyst comprising di-n-butylamine.

The bifunctional poly(arylene ether) has an intrinsic viscosity of about 0.03 to 0.12 deciliter per gram measured in chloroform at 25° C., specifically about 0.05 to about 0.10 deciliter per gram, more specifically about 0.05 to about 0.09 deciliter per gram, even more specifically about 0.05 to about 0.07 deciliter per gram.

Bifunctional poly(arylene ether)s can be prepared, for example, by oxidative copolymerization of a monohydric phenol and a dihydric phenol. Suitable monohydric phenols include, for example, 2,6-dimethylphenol, 2,3,6-trimethylphenol, and the like, and mixtures thereof. Suitable dihydric phenols include, for example, 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclononane, 1,1-bis(4-hydroxy-3,5-dimethylphenyl)cyclooctane, 1,1-bis(4-hydroxy-3-methylphenyl)cyclononane, 11,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane 2,2-bis(4-hydroxy-3-bromophenyl)propane, 1,1-bis(4-hydroxyphenyl) cyclopentane, 1,1-bis(4-hydroxyphenyl)cyclohexane, and mixtures thereof. In some embodiments, the bifunctional poly(arylene ether) is prepared by oxidative copolymerization of 2,6-dimethylphenol and 2,2-bis(3,5-dimethyl-4-hydroxyphenyl)propane. An illustrative initial reaction mixture composition for oxidative copolymerization of 2,6-dimethylphenol and 2,2-bis(3,5-dimethyl-4-hydroxyphenyl)propane is as follows: 50192 parts by weight of 2,6-dimethylphenol, 109581 parts by weight of toluene, 503 parts by weight of di-n-butylamine, 1175 parts by weight of dimethyl-n-butylamine, 264 parts by weight of a diamine mix containing N,N'-dibutylethylenediamine and didecyl dimethyl ammonium chloride, and 353 parts by weight of a catalyst mix containing 6.5 weight percent $Cu_2O$ in aqueous hydrogen bromide. The concentration of copper in the polymerization reaction mixture is about 125 parts per million by weight based on the total weight of the reaction mixture, or about 420 parts per million by weight based on the weight of poly (arylene ether) product. The concentration of poly(arylene ether) product in the polymerization reaction mixture is 29.8 weight percent based on the total weight of the reaction mixture. The product (uncapped) poly(arylene ether) has an intrinsic viscosity of 0.06 deciliter per gram measured in chloroform at 25° C.

The bifunctional poly(arylene ether) can also be prepared by a process comprising oxidatively polymerizing a monohydric phenol in the presence of a catalyst under conditions suitable to form a corresponding poly(arylene ether) and a corresponding diphenoquinone; separating the poly(arylene ether) and the diphenoquinone from the catalyst; and equilibrating the poly(arylene ether) and the diphenoquinone to form a poly(arylene ether) having two terminal hydroxy groups. An illustrative example of a corresponding poly (aiylene ether) is poly(2,6-dimethyl-1,4-phenylene ether) prepared from oxidative polymerization of 2,6-dimethylphenol. An illustrative example of a corresponding diphenoquinone is 3,3',5,5'-tetramethyl-4,4'-diphenoquinone formed by oxidation of 2,6-dimethylphenol.

The bifunctional poly(arylene ether) can also be prepared by a so-called redistribution reaction in which a monofunctional poly(arylene ether) is equilibrated with a dihydric phenol, optionally in the presence of an oxidizing agent. Redistribution reactions are known in the art and described, for example, in U.S. Pat. No. 3,496,236 to Cooper et al. and U.S. Pat. No. 5,880,221 to Liska et al.

The composition comprises at least 15 weight percent of a bifunctional poly(arylene ether), based on the total weight of the composition. Specifically, the composition can comprise a bifunctional poly(arylene ether) amount of about 20 to about 80 weight percent, more specifically about 30 to about 70 weight percent, even more specifically about 40 to about 60 weight percent, yet more specifically about 50 to about 60 weight percent.

In addition to the bifunctional poly(arylene ether), the composition comprises a solvent. The a solvent can be, for example, a $C_3$-$C_8$ ketone, a $C_4$-$C_8$ N,N-dialkylamide, a $C_4$-$C_{16}$ dialkyl ether, a $C_6$-$C_{12}$ aromatic hydrocarbon, a $C_1$-$C_3$ chlorinated hydrocarbon, a $C_3$-$C_6$ alkyl alkanoate, a $C_2$-$C_6$ alkyl cyanide, or a mixture thereof. The carbon number ranges refer to the total number of carbon atoms in the solvent molecule. For example, a $C_4$-$C_{16}$ dialkyl ether has 4 to 16 total carbon atoms, and the two alkyl groups can be the same or different. As another example, the 2 to 6 carbons in the "$C_2$-$C_6$ alkyl cyanides" include the carbon atom in the cyanide group. Specific ketone solvents include, for example, acetone, methyl ethyl ketone, methyl isobutyl ketone, and mixtures thereof. Specific $C_4$-$C_8$ N,N-dialkylamide solvents include, for example, dimethylformamide, dimethylacetamide, N-methyl-2-pyrrolidone (Chemical Abstracts Service Registry No. 872-50-4), and the like, and mixtures thereof. Specific dialkyl ether solvents include, for example, tetrahydrofuran, ethylene glycol monomethylether, dioxane, and the like, and mixtures thereof. In some embodiments, the $C_4$-$C_{16}$ dialkyl ethers include cyclic ethers such as tetrahydrofuran and dioxane. In some embodiments, the $C_4$-$C_{16}$ dialkyl ethers are noncyclic. The dialkyl ether may, optionally, further include one or more ether oxygen atoms within the alkyl groups and one or more hydroxy group substituents on the alkyl groups. The aromatic hydrocarbon solvent may or may not comprise an ethylenically unsaturated solvent. Specific aromatic hydrocarbon solvents include, for example, benzene, toluene, xylenes, styrene, divinylbenzenes, and the like, and mixtures thereof. The aromatic hydrocarbon solvent is preferably unhalogenated. That is, it does not include any fluorine, chlorine, bromine, or iodine atoms. Specific $C_3$-$C_6$ alkyl alkanoates include, for example, methyl acetate, ethyl acetate, methyl propionate, ethyl propionate, and the like, and mixtures thereof. Specific $C_2$-$C_6$ alkyl cyanides include, for example, acetonitrile, propionitrile, butyronitrile, and mixtures thereof. In some embodiments, the solvent is acetone. In some embodiments, the solvent is methyl ethyl ketone. In some embodiments, the solvent is methyl isobutyl ketone. In some embodiments, the solvent is N-methyl-2-pyrrolidone. In some embodiments, the solvent is ethylene glycol monomethyl ether.

The composition comprises at least 20 weight percent of the solvent, based on the total weight of the composition. Specifically, the solvent amount can be 20 to about 85 weight percent, more specifically about 30 to about 80 weight percent, even more specifically about 40 to about 70 weight percent, yet more specifically about 40 to about 60 weight percent, still more specifically about 40 to about 50 weight percent.

The bifunctional poly(arylene ether) has a solubility in the composition of at least 100 grams per kilogram of composition at 23° C. Unless otherwise specified, "solubility" refers to initial solubility. For example, if a bifunctional poly (arylene ether) has a solubility in the composition of at least 100 grams per kilogram, it is possible to dissolve at least 100 grams of bifunctional poly(arylene ether) in one kilogram of composition at 23° C. The bifunctional poly(arylene ether) may or may not remain dissolved if the composition is allowed to remain at the specified temperature. Procedures for determining initial solubility and solubility over time are described in the working examples below. There is no particular upper limit on the solubility of the bifunctional poly (arylene ether) in the composition. However, compositions comprising more than 700 grams of bifunctional poly(arylene ether) per kilogram of composition are sometimes highly viscous and difficult to handle. In some embodiments the bifunctional poly(arylene ether) has a solubility in the composition of 100 to about 700 grams per kilogram of composition at 23° C. While the bifunctional poly(arylene ether) has a solubility in the composition of at least 100 grams per kilogram of composition at 23° C., higher solubilities are often observed. For example, the solubility of the bifunctional poly(arylene ether) in the composition at 23° C. can be at least 200 grams per kilogram, specifically at least 300 grams per kilogram, more specifically at least 400 grams per kilogram, even more specifically at least 500 grams per kilogram.

One property of the composition that facilitates its use is its low viscosity. Thus, in some embodiments, the composition has a viscosity less than or equal to 2000 centipoise at 23° C. In some embodiments, the composition has viscosity of about 10 to about 2000 centipoise, specifically about 20 to about 1000 centipoise, more specifically about 50 to about 800 centipoise, even more specifically about 50 to about 600 centipoise.

The bifunctional poly(arylene ether) can also exhibit not just initial solubility but also extended solubility at a given temperature. For example, the bifunctional poly(arylene ether) can be soluble in the composition at any of the above described concentrations for one day at 23° C., specifically two days at 23° C., more specifically seven days at 23° C. In some embodiments, all of the bifunctional poly(arylene ether) present in the composition is soluble for the specified duration at the specified temperature.

The solubility of the bifunctional poly(arylene ether) can be described not only in terms of solubility in the composition (which can comprise other components in addition to the bifunctional poly(arylene ether) and the solvent), but also in terms of the bifunctional poly(arylene ether) and the solvent. For example, in some embodiments, the bifunctional poly (arylene ether) has a 23° C. solubility (that is, an initial solubility) in the solvent of at least 15 weight percent based on the total weight of the bifunctional poly(arylene ether) and the solvent. In some embodiments, the bifunctional poly(arylene ether) has a 23° C. solubility in the solvent of 15 to about 80 weight percent, specifically about 20 to about 70 weight percent, more specifically about 30 to about 60 weight percent, even more specifically about 40 to about 60 weight percent, still more specifically about 50 to about 60 weight percent. As for the solubility in the composition, the solubility in the solvent can persist over time. Thus, in some embodiments, the bifunctional poly(arylene ether) has a one-day 23° C. solubility in the solvent of at least 15 weight percent based on the total weight of the bifunctional poly(arylene ether) and the solvent. The phrase "one-day 23° C. solubility" means that the bifunctional poly(arylene ether) is soluble at the stated concentration for at least 24 hours at 23° C. In some embodiments, the bifunctional poly(arylene ether) has a two-day 23° C. solubility in the solvent of at least 15 weight percent based on the total weight of the bifunctional poly (arylene ether) and the solvent. In some embodiments, the bifunctional poly(arylene ether) has a seven-day 23° C. solubility in the solvent of at least 15 weight percent based on the total weight of the bifunctional poly(arylene ether) and the solvent. The above one-day, two-day, and seven-day solubilities can be 15 to about 80 weight percent, specifically about 20 to about 70 weight percent, more specifically about 30 to about 60 weight percent, even more specifically about 40 to about 60 weight percent, still more specifically about 50 to about 60 weight percent.

The solubility of the bifunctional poly(arylene ether) in the solvent extents to temperatures substantially below room temperature. Thus, in some embodiments, the bifunctional poly(arylene ether) has a 2° C. solubility (that is, an initial 2° C. solubility) in the solvent of at least 15 weight percent based on the total weight of the bifunctional poly(arylene ether) and the solvent. The solubility at 2° C. can extend to one day, or two days, or seven days, or longer. The above one-day, two-day, and seven-day solubilities can be 15 to about 80 weight percent, specifically about 20 to about 70 weight percent, more specifically about 30 to about 60 weight percent, even more specifically about 40 to about 60 weight percent, still more specifically about 50 to about 60 weight percent. The bifunctional poly(arylene ether) has a 2° C. solubility of 15 weight percent in the solvent if, for example, a 15 weight percent solution of the bifunctional poly(arylene ether) can be prepared at 23° C. and cooled to 2° C. without forming a precipitate or visually detectable turbidity. If, after seven days, there is still no precipitate or visually detectable turbidity, the bifunctional poly(arylene ether) has a 7-day 2° C. solubility of 15 weight percent in the solvent.

In some embodiments, the bifunctional poly(arylene ether) has a −10° C. solubility (that is, an initial −10° C. solubility) in the solvent of at least 15 weight percent based on the total weight of the bifunctional poly(arylene ether) and the solvent. The solubility at −10° C. can extend to one day, or two days, or seven days, or longer. The above one-day, two-day, and seven-day solubilities can be 15 to about 80 weight percent, specifically about 20 to about 70 weight percent, more specifically about 30 to about 60 weight percent, even more specifically about 40 to about 60 weight percent, still more specifically about 50 to about 60 weight percent.

The composition is substantially free of $C_1$-$C_6$ alkanols. The $C_1$-$C_6$ alkanols include, for example, methanol, ethanol, n-propanol, isopropanol, n-butanol, t-butanol, and the like. In the context of the $C_1$-$C_6$ alkanols, "substantially free" means that the composition comprises less than or equal to 0.5 weight percent of the $C_1$-$C_6$ alkanols, specifically less than or equal to 0.1 weight percent of the $C_1$-$C_6$ alkanols, more specifically no intentionally added $C_1$-$C_6$ alkanols.

The composition is substantially free of alkali metal ions. Alkali metal ions include lithium ion, sodium ion, potassium ion, rubidium ion, cesium ion, francium ion, and combinations thereof. In the context of the alkali metal ions, "substantially free" means that the composition comprises less than or equal to 0.5 weight percent of alkali metal ions, specifically less than or equal to 0.1 weight percent of alkali metal ions, more specifically no intentionally added alkali metal ions.

The composition is substantially free of metal ions effective for the catalysis of oxidative polymerization of phenols (for brevity, "catalyst metal ions"). Such catalyst metal ions are known in the art and include, for example, copper, manganese, cobalt, iron, and combinations thereof. In the context of the catalyst metal ions, "substantially free" means that the composition comprises less than or equal to 100 parts per million by weight of catalyst metal ions, specifically less than or equal to 20 parts per million by weight of catalyst metal ions, more specifically no intentionally added catalyst metal ions. It will be understood that if a catalyst metal ion is used to synthesize a bifunctional poly(arylene ether), and the synthesis and isolation procedure includes one or more steps to separate 95% or more of the catalyst metal ion from the bifunctional poly(arylene ether), then any residual catalyst metal ion in the isolated poly(arylene ether) will be regarded as not intentionally added.

The compositions are useful as a means of introducing a concentrated yet dissolved amount of bifunctional poly (arylene ether) into a thermoset. For example, the composition can comprise or consist of about 40 to about 80 weight percent of the bifunctional poly(arylene ether) and about 20 to about 60 weight percent of the solvent. Particularly useful compositions include in which the solvent is methyl ethyl ketone and the bifunctional poly(arylene ether) is a copolymer of 2,6-dimethylphenol and 2,2-bis(3,5-dimethyl-4-hydroxyphenol)propane having an intrinsic viscosity of 0.05 to 0.07 deciliter per gram measured in chloroform at 25° C. As demonstrated in the working examples below, such compositions exhibit exceptional solubility of the bifunctional poly (arylene ether) that extends well below room temperature.

In some embodiments, the composition is substantially free of any polymer other than a poly(arylene ether). In this context, the term "poly(arylene ether)" includes not just bifunctional poly(arylene ether)s having an intrinsic viscosity of about 0.03 to 0.12 deciliter per gram, but also includes any poly(arylene ether) comprising repeating units having the structure

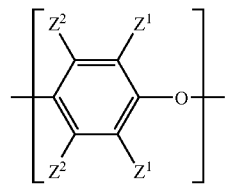

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. For example, the poly(arylene ether) can be monofunctional. As another example, the poly(arylene ether) can have an intrinsic viscosity up to about 1 deciliter per gram. In the context of the composition being substantially free of any polymer other than a poly(arylene ether), "substantially free" means that the composition comprises less than or equal to 0.5 weight percent of non-poly(arylene ether) polymers, specifically less than or equal to 0.1 weight percent of non-poly(arylene ether) polymers, more specifically no intentionally added non-poly(arylene ether) polymers.

In some embodiments, the composition is substantially free of halide ions. Halide ions include fluoride, chloride, bromide, iodide, and astatide. In this context, "substantially free" means that the composition comprises less than or equal to 1 part per thousand by weight of halide ions, specifically less than or equal to 200 parts per million by weight of halide ions, more specifically less than or equal to 50 parts per million by weight of halide ions, still more specifically no intentionally added halide ions.

In some embodiments, the composition is substantially free of nitrogen-containing ligands effective as components of catalysts for the oxidative polymerization of phenols. These nitrogen-containing ligands are used in combination with metal ions such as copper ion or manganese ion to form effective catalysts for the oxidative polymerization of phenols. Such ligands are known in the art and include, for example, alkylenediamine ligands, primary monoamines, secondary monoamines, tertiary monoamines, aminoalcohols, oximes, oxines, and the like, and combinations thereof. Specific nitrogen-containing ligands include, for example, the alkylenediamine ligands N,N'-di-t-butylethylenediamine and N,N,N',N'-tetramethyl-1,3-diaminopropane, the primary monoamine n-butylamine, the secondary monoamines di-n-butylamine, the tertiary monoamine dimethyl-n-butylamine, the aminoalcohol N-phenyl-ethanolamine, the oxime 2-hydroxy-2-phenylacetophenone oxime (benzoin oxime), and the oxime 5-methyloxine. Other nitrogen-containing ligands are described in, for example, U.S. Pat. No. 6,407,200 B1 of Singh et al. In the context of these nitrogen-containing ligands, "substantially free" means that the composition comprises less than or equal to 0.5 weight percent of nitrogen-containing ligands, specifically less than or equal to 0.1 weight percent of nitrogen-containing ligands, more specifically no intentionally added nitrogen-containing ligands.

In some embodiments, the composition is substantially free of thermoset resin. Thermoset resins include, for example, epoxy resins, phenolic resins, alkyds, unsaturated polyester resins, polyimide, polyurethane, mineral filled silicone, maleimide resins, cyanate ester resins, vinyl resins, benzocyclobutene resins, and combinations thereof. The vinyl resins include the "olefinically unsaturated monomers" described in U.S. Patent Application Publication No. U.S. 2006/0041086 A1 of Birsalc et al. These olefinically unsaturated monomers include, for example, alkenyl aromatic monomers, allylic monomers, acryloyl monomers, vinyl ethers, and combinations thereof. In the context of the thermoset resin, "substantially free" means that the composition comprises less than or equal to 1 weight percent thermoset resin, more specifically less than or equal to 0.1 weight percent thermoset resin, still more specifically no intentionally added thermoset resin. In some embodiments, the composition is substantially free of any component comprising a polymerizable carbon-carbon double bond or triple bond. In this context, "substantially free" means that the composition comprises less than or equal to 1 weight percent of such a polymerizable component, more specifically less than or equal to 0.1 weight percent of such a polymerizable component.

One embodiment is a composition, consisting of: 15 to about 80 weight percent of a bifunctional poly(arylene ether) having an intrinsic viscosity of about 0.03 to 0.12 deciliter per gram measured in chloroform at 25° C.; wherein the bifunctional poly(arylene ether) has the structure

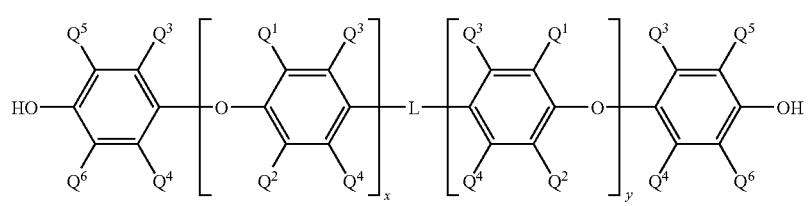

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to 20, more specifically 0 to 15, still more specifically 0 to 10, even more specifically 0 to 8, with the proviso that the sum of x and y is at least 2, or at least 3, or at least 4; and L has the structure

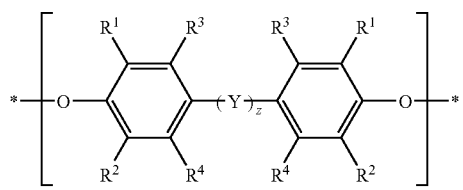

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

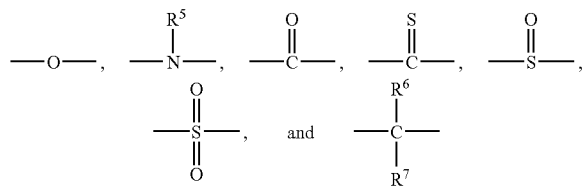

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and about 20 to 85 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof; wherein the bifunctional poly(arylene ether) has a solubility (that is, an initial solubility) in the composition of at least 100 grams per kilogram of composition at 23° C.; wherein the composition is substantially free of $C_1$-$C_6$ alkanols, alkali metal ions, and metal ions effective for the catalysis of oxidative polymerization of phenols; and wherein all weight percents are based on the total weight of the composition.

The at least 15 weight percent of a bifunctional poly(arylene ether) can be 15 to about 80 weight percent, specifically about 20 to about 70 weight percent, more specifically about 30 to about 60 weight percent, even more specifically about 40 to about 60 weight percent, yet more specifically about 50 to about 60 weight percent. The intrinsic viscosity of the bifunctional poly(arylene ether) can be about 0.03 to about 0.12 deciliter per gram, specifically about 0.05 to about 0.10 deciliter per gram, more specifically about 0.05 to about 0.09 deciliter per gram, even more specifically about 0.05 to about 0.07 deciliter per gram, all as measured in chloroform at 25° C. The weight percent of solvent in the composition can be about 20 to about 85 weight percent, specifically about 30 to about 80 weight percent, more specifically about 40 to about 70 weight percent, still more specifically about 40 to about 60 weight percent, yet more specifically about 40 to about 50 weight percent, all based on the total weight of the composition.

One embodiment is a composition, comprising: about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

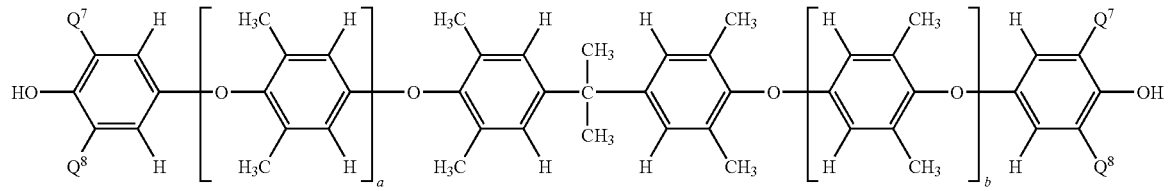

wherein each occurrence of $Q^7$ and $Q^8$ is independently methyl or di-n-butylaminomethyl; and each occurrence of a and b is independently 1 to about 20, with the proviso that the sum of a and b is at least 2 or at least 3 or at least 4; and about 40 to about 70 weight percent of a solvent selected from the group consisting of methyl ethyl ketone, methyl isobutyl ketone, N,N-dimethylformamide, N-methylpyrrolidone, and mixtures thereof; wherein the bifunctional poly(arylene ether) is soluble in the composition at 23° C. for seven days; and wherein all weight percents are based on the total weight of the composition. The solvent can be methyl isobutyl ketone.

In one embodiment, the composition consists of about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

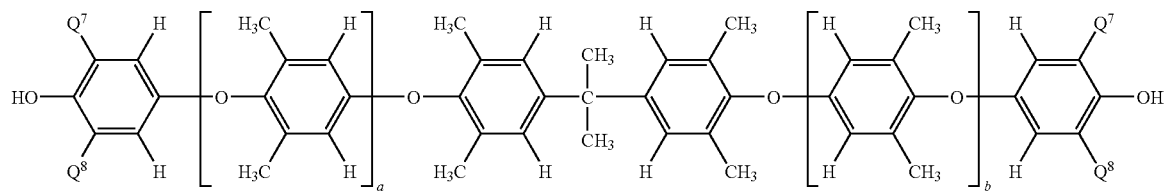

wherein each occurrence of $Q^7$ and $Q^8$ is independently methyl or di-n-butylaminomethyl; and each occurrence of a and b is independently 1 to about 20, with the proviso that the sum of a and b is at least 2 or at least 3 or at least 4; and about 40 to about 70 weight percent of a solvent selected from the group consisting of methyl ethyl ketone, methyl isobutyl ketone, N,N-dimethylformamide, N-methylpyrrolidone, and mixtures thereof; wherein the bifunctional poly(arylene ether) is soluble in the composition at 23° C. for seven days; and wherein all weight percents are based on the total weight of the composition. In some embodiments, the solvent is methyl isobutyl ketone.

There is no particular limitation on the method of preparing the composition. For example, the bifunctional poly(arylene ether) in solid form can be combined with the solvent to form a mixture, and the mixture can be agitated and, optionally, heated to dissolve the bifunctional poly(arylene ether). In some embodiments, the solid form of the poly(arylene ether) is a powder. This facilitates dissolution of the poly(arylene ether) in the solvent.

The invention is further illustrated by the following non-limiting examples.

EXAMPLES 1-113

Comparative Examples 1-45

The following examples illustrate the high solubility of low intrinsic viscosity bifunctional poly(arylene ether)s. In particular, these examples demonstrate the unexpectedly superior solubility of bifunctional poly(arylene ether)s compared to monofunctional poly(arylene ether)s of the same intrinsic viscosity.

Five different poly(aiylene ether)s were used in these experiments, and their properties are summarized in Table 1. Intrinsic viscosities were measured at 25° C. in chloroform on poly(arylene ether) samples that had been dried for 1 hour at 125° C. under vacuum. Values of number average molecular weight ($M_n$), weight average molecular weight ($M_w$), and polydispersity ($M_w/M_n$) were determined by gel permeation chromatography (GPC). The chromatographic system consisted of an Agilent Series 1100 system, including isocratic pump, autosampler, thermostatted column compartment, and multi-wavelength detector. The elution solvent was chloroform with 50 parts per million by weight of di-n-butylamine. Sample solutions were prepared by dissolving 0.01 gram of sample in 20 milliliters chloroform with toluene (0.25 milliliter per liter) as an internal marker. The sample solutions were filtered through a Gelman 0.45 micrometer syringe filter before GPC analysis; no additional sample preparation was performed. The injection volume was 50 microliters and the eluent flow rate was set at 1 milliliter/minute. Two Polymer Laboratories GPC columns (Phenogel 5 micron linear(2), 300×7.80 millimeters) connected in series were used for separation of the sample. The detection wavelength was set at 280 nanometers. The data were acquired and processed using an Agilent ChemStation with integrated GPC data analysis software. The molecular weight distribution results were calibrated with polystyrene standards. The results are reported without any correction as "$M_n$ (AMU)" and "$M_w$ (AMU)".

The poly(arylene ether) designated "PPE 0.12 monofxl." in Table 1 was a poly(2,6-dimethyl-1,4-phenylene ether) having an intrinsic viscosity of 0.12 deciliter per gram (dL/g) as measured at 25° C. in chloroform. It was prepared by oxidative polymerization of 2,6-dimethylphenol. The poly(arylene ether) designated "PPE 0.06 monofxl." in Table 1 was similar except that it had an intrinsic viscosity of 0.06 deciliter per gram. The poly(arylene ether) designated "PPE 0.12 bifxl." in Table 1 was an oxidative copolymer of 2,6-dimethylphenol and 2,2-bis(3,5-dimethyl-4-hydroxyphenyl)propane having an intrinsic viscosity of 0.12 deciliter per gram as measured at 25° C. in chloroform. The poly(arylene ether)s designated "PPE 0.09 bifxl." and "PPE 0.06 bifxl." were similar, except that they had intrinsic viscosities of 0.09 and 0.06 deciliter per gram, respectively.

TABLE 1

|  | PPE 0.12 monofxl. | PPE 0.12 bifxl. | PPE 0.09 bifxl. | PPE 0.06 monofxl. | PPE 0.06 bifxl. |
|---|---|---|---|---|---|
| Intrinsic viscosity (dL/g) | 0.12 | 0.12 | 0.09 | 0.06 | 0.06 |
| End group | OH | OH | OH | OH | OH |
| Functionality | Mono | Bi | Bi | Mono | Bi |
| $M_n$ (AMU) | 1964 | 1921 | 1198 | 886 | 799 |
| $M_w$ (AMU) | 5148 | 4378 | 2477 | 1873 | 1690 |
| $M_w/M_n$ | 2.62 | 2.28 | 2.07 | 2.11 | 2.12 |
| $T_g$ (° C.) | 157.9 | 147.8 | 115.8 | 95.9 | 99.6 |
| Absolute $M_n$ | 2294 | 2747 | 1551 | 1133 | 1183 |

The solvents used were toluene, methyl ethyl ketone, chloroform, and N,N-dimethylformamide. Toluene (CAS Reg. No. 108-88-3) was purchased from ACROS with a HPLC grade purity of 99.8%. Methyl ethyl ketone (2-butanone; CAS Reg. No. 78-93-3) was purchased from ACROS ORGANICS with a 99+% purity. Chloroform (CAS Reg. No. 67-66-3) was purchased fiom OmniSolve as a high purity solvent. N,N-dimethylformamide (CAS Reg. No. 68-12-2) was purchased from ACROS with a HPLC grade purity of 99.8%.

For each example, a poly(arylene ether) was combined with a solvent at 23° C. Toluene mixtures were heated to 70-80° C. using a water bath to facilitate dissolution. Methyl ethyl ketone mixtures were heated to 50-60° C. using a water bath to facilitate dissolution. Chloroform and DMF mixtures were prepares as follows: the specified quantity of solvent was added to a 59 milliliter (2 ounce) cylindrical glass bottle; poly(arylene ether) was then added and the bottle was sealed with a screw cap; the bottle was set in an oil bath at 32° C. for 15 minutes; then, the bottle was set on shaker at (at 23° C. in air) for 1 hour.

The warm solutions with all solvents were allowed to cool to ambient temperature (23° C.). The resulting solution remained at 23° C. and the initial solubility was assessed. If the mixture remained homogeneous by visual inspection, the composition was characterized as soluble ("sol" in Tables 2-18). If the mixture solidified upon cooling to 23° C., the mixture was characterized as solid ("solid" in Tables 2-18). If the mixture did not form a homogeneous solution, it was characterized as insoluble ("insol" in Tables 2-18). The mixture was then left at 23° C. for seven days. Once per day, mixtures were characterized as soluble, solid, or insoluble as described for the initial solubility testing. If, however, the mixture was initially soluble but a precipitate formed over the course of the seven-day period, the sample was characterized as precipitated ("ppt" in Tables 2-18) and the number of days at which the poly(arylene ether) remained soluble was noted ("Days soluble" in Tables 2, 7, 9, and 16-18).

Viscosity values were determined for the freshly prepared compositions and are reported in centipoise (cps). Viscosity values were measured using a Brookfield digital Viscometer, Model DV-II, following the procedure in accompanying Manufacturing Operation Manual No: m/85-160-G. If the viscosity was not measured or could not be measured for a certain composition, it was reported as "not available" ("NA" in Tables 2-18).

Tables 2-5 present solubility and viscosity results in toluene as a function of poly(arylene ether) type and concentration. The concentrations of the poly(arylene ether)s are expressed as weight percent (wt %) based on the total weight of the composition, and also in grams (g). The weights of the solvents used are expressed in grams.

TABLE 2

|  | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 |
|---|---|---|---|---|---|---|---|---|---|
| PPE 0.12 monofxl. (wt %) | 10 | 15 | 20 | 25 | 30 | 35 | 40 | 45 | 50 |
| PPE 0.12 monofxl. (g) | 3.69 | 5.60 | 7.54 | 9.52 | 11.54 | 13.61 | 15.72 | 17.87 | 20.07 |
| Toluene (g) | 35.51 | 33.77 | 32.00 | 30.21 | 28.40 | 26.56 | 24.69 | 22.79 | 20.87 |
| Initial solubility | sol | sol | sol | sol | solid | solid | solid | solid | solid |
| 7-day Solubility | sol | sol | ppt | ppt | NA | NA | NA | NA | NA |
| Viscosity (cps) | NA | NA | 225 | 1160 | NA | NA | NA | NA | NA |
| Days soluble | — | — | 2 | 2 | — | — | — | — | — |

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| PPE 0.12 bifxl. (wt %) | 10 | 15 | 20 | 25 | 30 | 35 | 40 | 45 | 50 | 55 |
| PPE 0.12 bifxl. (g) | 3.69 | 5.60 | 7.54 | 9.52 | 11.54 | 13.61 | 15.72 | 17.87 | 20.07 | 22.32 |
| Toluene (g) | 35.51 | 33.77 | 32.00 | 30.21 | 28.40 | 26.56 | 24.69 | 22.79 | 20.87 | 18.92 |
| Initial solubility | sol | sol | sol | sol | sol | sol | sol | sol | sol | sol |
| 7-day Solubility | sol | sol | sol | sol | sol | sol | sol | sol | sol | sol |
| Viscosity (cps) | NA | NA | NA | NA | NA | NA | 617 | 1259 | 2454 | 4897 |

TABLE 4

|  | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|
| PPE 0.09 bifxl. (wt %) | 10 | 15 | 20 | 25 | 30 | 35 | 40 | 45 | 50 | 55 | 60 |
| PPE 0.09 bifxl. (g) | 3.69 | 5.60 | 7.54 | 9.52 | 11.54 | 13.61 | 15.72 | 17.87 | 20.07 | 22.32 | 24.61 |
| Toluene (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | sol | sol | sol | sol | sol | sol | sol |
| 7-day Solubility | sol | sol | sol | sol | sol | sol | sol | sol | sol | sol | sol |
| Viscosity (cps) | NA | NA | NA | NA | NA | NA | 269 | 427 | 660 | 1479 | NA |

TABLE 5

|  | Ex. 22 | Ex. 23 | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|---|---|
| PPE 0.06 bifxl. (wt %) | 10 | 15 | 20 | 25 | 30 | 35 | 40 | 45 | 50 | 55 | 60 |
| PPE 0.06 bifxl. (g) | 3.69 | 5.60 | 7.54 | 9.52 | 11.54 | 13.61 | 15.72 | 17.87 | 20.07 | 22.32 | 24.61 |
| Toluene (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | sol | sol | sol | sol | sol | sol | sol |
| 7-day Solubility | sol | sol | sol | sol | sol | sol | sol | sol | sol | sol | sol |
| Viscosity (cps) | NA | NA | NA | NA | NA | NA | 81 | 132 | 265 | 475 | NA |

By comparing Tables 2 and 3, it can be seen that the bifunctional 0.12 dL/g poly(arylene ether) has a much greater solubility in toluene than the monofunctional 0.12 dL/g poly(arylene ether) under the same conditions. It can also be seen that the bifunctional 0.09 and 0.06 dL/g poly(arylene ether)s exhibit excellent solubility properties in toluene.

Tables 6-10 present solubility results for the different poly(arylene ether) resins in methyl ethyl ketone (MEK).

TABLE 6

|  | C. Ex. 10 | C. Ex. 11 | C. Ex. 12 | C. Ex. 13 | C. Ex. 14 | C. Ex. 15 | C. Ex. 16 | C. Ex. 17 | C. Ex. 18 |
|---|---|---|---|---|---|---|---|---|---|
| PPE 0.12 monofxl. (wt %) | 10 | 15 | 20 | 25 | 30 | 35 | 40 | 45 | 50 |
| PPE 0.12 monofxl. (g) | 3.69 | 5.60 | 7.54 | 9.52 | 11.54 | 13.61 | 15.72 | 17.87 | 20.07 |
| MEK (g) | 35.51 | 33.77 | 32.00 | 30.21 | 28.40 | 26.56 | 24.69 | 22.79 | 20.87 |
| Initial solubility | insol | insol | insol | insol | insol | insol | insol | insol | insol |
| 7-day Solubility | insol | insol | insol | insol | insol | insol | insol | insol | insol |

TABLE 7

|  | Ex. 33 | Ex. 34 | Ex. 35 | Ex. 36 | Ex. 37 | Ex. 38 | Ex. 39 | Ex. 40 | Ex. 41 | Ex. 42 | Ex. 43 |
|---|---|---|---|---|---|---|---|---|---|---|---|
| PPE 0.12 bifxl. (wt %) | 10 | 15 | 20 | 25 | 30 | 35 | 40 | 45 | 50 | 55 | 60 |
| PPE 0.12 bifxl. (g) | 3.69 | 5.60 | 7.54 | 9.52 | 11.54 | 13.61 | 15.72 | 17.87 | 20.07 | 22.32 | 24.61 |
| MEK (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | insol | insol | insol | insol | insol | insol | insol |
| 7-day Solubility | ppt | ppt | ppt | ppt | insol | insol | insol | insol | insol | insol | insol |
| Days soluble | 1 | 1 | 1 | 1 | — | — | — | — | — | — | — |

TABLE 8

|  | Ex. 44 | Ex. 45 | Ex. 46 | Ex. 47 | Ex. 48 | Ex. 49 | Ex. 50 | Ex. 51 | Ex. 52 | Ex. 53 | Ex. 54 |
|---|---|---|---|---|---|---|---|---|---|---|---|
| PPE 0.09 bifxl. (wt %) | 10 | 15 | 20 | 25 | 30 | 35 | 40 | 45 | 50 | 55 | 60 |
| PPE 0.09 bifxl. (g) | 3.69 | 5.60 | 7.54 | 9.52 | 11.54 | 13.61 | 15.72 | 17.87 | 20.07 | 22.32 | 24.61 |
| MEK (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | sol | sol | sol | sol | sol | sol | sol |
| 7-day Solubility | sol | sol | sol | sol | sol | sol | sol | sol | sol | sol | sol |
| Viscosity (cps) | NA | NA | NA | NA | NA | NA | 20 | 81 | 362 | 1380 | 6438 |

TABLE 9

|  | C. Ex. 19 | C. Ex. 20 | C. Ex. 21 | C. Ex. 22 | C. Ex. 23 | C. Ex. 24 | C. Ex. 25 | C. Ex. 26 | C. Ex. 27 | C. Ex. 28 | C. Ex. 29 |
|---|---|---|---|---|---|---|---|---|---|---|---|
| PPE 0.06 monofxl. (wt %) | 10 | 15 | 20 | 25 | 30 | 35 | 40 | 45 | 50 | 55 | 60 |
| PPE 0.06 monofxl. (g) | 3.69 | 5.60 | 7.54 | 9.52 | 11.54 | 13.61 | 15.72 | 17.87 | 20.07 | 22.32 | 24.61 |
| MEK (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | sol | sol | sol | sol | sol | insol | insol |
| 7-day Solubility | ppt | ppt | ppt | ppt | ppt | ppt | ppt | ppt | ppt | insol | insol |
| Days soluble | 1 | 1 | 1 | 1 | 1 | 1 | 1 | 1 | 1 | — | — |

TABLE 10

|  | Ex. 55 | Ex. 56 | Ex. 57 | Ex. 58 | Ex. 59 | Ex. 60 | Ex. 61 | Ex. 62 | Ex. 63 | Ex. 64 | Ex. 65 |
|---|---|---|---|---|---|---|---|---|---|---|---|
| PPE 0.06 bifxl. (wt %) | 10 | 15 | 20 | 25 | 30 | 35 | 40 | 45 | 50 | 55 | 60 |
| PPE 0.06 bifxl. (g) | 3.69 | 5.60 | 7.54 | 9.52 | 11.54 | 13.61 | 15.72 | 17.87 | 20.07 | 22.32 | 24.61 |
| MEK (g) | 35.51 | 33.77 | 32.00 | 30.21 | 28.40 | 26.56 | 24.69 | 22.79 | 20.87 | 18.92 | 16.94 |
| Initial solubility | sol | sol | sol | sol | sol | sol | sol | sol | sol | sol | sol |
| 7-day Solubility | sol | sol | sol | sol | sol | sol | sol | sol | sol | sol | sol |
| Viscosity (cps) | NA | NA | NA | NA | NA | NA | 12 | 50 | 205 | 760 | 3200 |

The effect of using bifunctional versus monofunctional poly(arylene ether) on solubility in MEK can be seen by comparing Tables 6 and 7, and Tables 9 and 10. Table 6 lists the data for the monofunctional 0.12 dL/g poly(arylene ether). It can be seen that none of these compositions form homogeneous mixtures. On the other hand, the bifunctional 0.12 dL/g poly(arylene ether) is completely soluble in MEK in compositions comprising 10-25 weight percent poly(arylene ether) as illustrated in Table 7, Examples 33-36. The monofunctional 0.06 dL/g poly(arylene ether) is soluble in MEK in compositions comprising 10-50 wt % poly(arylene ether) as illustrated in Comparative Examples 19-27. This same monofunctional poly(arylene ether), however, is not soluble in MEK at higher concentrations, and Comparative Examples 19-27 all formed precipitates after standing at room temperature for seven days. On the other hand, the bifunctional 0.06 dL/g poly(arylene ether) formed homogeneous solutions with MEK in all the tested concentrations, and it did not produce a precipitate after standing at room temperature for seven days. The bifunctional 0.09 dL/g poly(arylene ether) exhibits excellent solubility at concentrations up to 50 weight percent.

Tables 11-14 present solubility results for the monofunctional 0.12 dL/g poly(arylene ether) and all the bifunctional poly(arylene ether)s in chloroform.

TABLE 11

|  | C. Ex. 30 | C. Ex. 31 | C. Ex. 32 | C. Ex. 33 | C. Ex. 34 | C. Ex. 35 | C. Ex. 36 | C. Ex. 37 |
|---|---|---|---|---|---|---|---|---|
| PPE 0.12 monofxl. (wt %) | 20 | 25 | 30 | 40 | 45 | 50 | 60 | 70 |
| PPE 0.12 monofxl. (g) | 8.46 | 10.58 | 12.69 | 16.92 | 19.03 | 21.15 | 25.38 | 29.61 |
| Chloroform (g) | 33.84 | 31.72 | 29.61 | 25.38 | 23.26 | 21.15 | 16.92 | 12.69 |
| Initial solubility | sol | sol | sol | sol | insol | insol | insol | insol |
| 7-day Solubility | sol | sol | sol | sol | insol | insol | insol | insol |

TABLE 12

|  | Ex. 66 | Ex. 67 | Ex. 68 | Ex. 69 | Ex. 70 | Ex. 71 | Ex. 72 | Ex. 73 |
|---|---|---|---|---|---|---|---|---|
| PPE 0.12 bifxl. (wt %) | 20 | 25 | 30 | 40 | 45 | 50 | 60 | 70 |
| PPE 0.12 bifxl. (g) | 8.46 | 10.58 | 12.69 | 16.92 | 19.03 | 21.15 | 25.38 | 29.61 |
| Chloroform (g) | 33.84 | 31.72 | 29.61 | 25.38 | 23.26 | 21.15 | 16.92 | 12.69 |
| Initial solubility | sol | sol | sol | sol | sol | sol | insol | insol |
| 7-day Solubility | sol | sol | sol | sol | sol | sol | insol | insol |

TABLE 13

|  | Ex. 74 | Ex. 75 | Ex. 76 | Ex. 77 | Ex. 78 | Ex. 79 | Ex. 80 | Ex. 81 |
|---|---|---|---|---|---|---|---|---|
| PPE 0.09 bifxl. (wt %) | 20 | 25 | 30 | 40 | 45 | 50 | 60 | 70 |
| PPE 0.09 bifxl. (g) | 8.46 | 10.58 | 12.69 | 16.92 | 19.03 | 21.15 | 25.38 | 29.61 |
| Chloroform (g) | 33.84 | 31.72 | 29.61 | 25.38 | 23.26 | 21.15 | 16.92 | 12.69 |
| Initial solubility | sol | sol | sol | sol | sol | sol | insol | insol |
| 7-day Solubility | sol | sol | sol | sol | sol | sol | insol | insol |

TABLE 14

|  | Ex. 82 | Ex. 83 | Ex. 84 | Ex. 85 | Ex. 86 | Ex. 87 | Ex. 88 | Ex. 89 |
|---|---|---|---|---|---|---|---|---|
| PPE 0.06 bifxl. (wt %) | 20 | 25 | 30 | 40 | 45 | 50 | 60 | 70 |
| PPE 0.06 bifxl. (g) | 8.46 | 10.58 | 12.69 | 16.92 | 19.03 | 21.15 | 25.38 | 29.61 |
| Chloroform (g) | 33.84 | 31.72 | 29.61 | 25.38 | 23.26 | 21.15 | 16.92 | 12.69 |
| Initial solubility | sol | sol | sol | sol | sol | sol | insol | insol |
| 7-day Solubility | sol | sol | sol | sol | sol | sol | insol | insol |

The data in Tables 11-14 show that the solubility of the poly(arylene ether)s improves at higher concentrations as the intrinsic viscosity decreases, and as bifunctional rather than monofunctional poly(arylene ether) is used. As shown in Table 11, the monofunctional 0.12 dL/g poly(arylene ether) was insoluble in chloroform at concentrations higher than 40 weight percent. In contrast, as shown in Tables 12-14, the bifunctional poly(arylene ether)s having intrinsic viscosities of 0.12, 0.09, and 0.06 dL/g were all soluble in chloroform at concentrations as high as 50 weight percent.

Tables 15-18 present solubility data for the monofunctional 0.12 dL/g poly(arylene ether) and all the bifunctional poly(arylene ether)s in N,N-dimethylformamide (DMF).

TABLE 15

|  | C. Ex. 38 | C. Ex. 39 | C. Ex. 40 | C. Ex. 41 | C. Ex. 42 | C. Ex. 43 | C. Ex. 44 | C. Ex. 45 |
|---|---|---|---|---|---|---|---|---|
| PPE 0.12 monofxl. (wt %) | 20 | 25 | 30 | 40 | 45 | 50 | 60 | 70 |
| PPE 0.12 monofxl. (g) | 8.46 | 10.58 | 12.69 | 16.92 | 19.03 | 21.15 | 25.38 | 29.61 |
| DMF (g) | 33.84 | 31.72 | 29.61 | 25.38 | 23.26 | 21.15 | 16.92 | 12.69 |
| Initial solubility | insol | insol | insol | insol | insol | insol | insol | insol |
| 7-day Solubility | insol | insol | insol | insol | insol | insol | insol | insol |

TABLE 16

|  | Ex. 90 | Ex. 91 | Ex. 92 | Ex. 93 | Ex. 94 | Ex. 95 | Ex. 96 | Ex. 97 |
|---|---|---|---|---|---|---|---|---|
| PPE 0.12 bifxl. (wt %) | 20 | 25 | 30 | 40 | 45 | 50 | 60 | 70 |
| PPE 0.12 bifxl. (g) | 8.46 | 10.58 | 12.69 | 16.92 | 19.03 | 21.15 | 25.38 | 29.61 |
| DMF (g) | 33.84 | 31.72 | 29.61 | 25.38 | 23.26 | 21.15 | 16.92 | 12.69 |
| Initial solubility | sol | sol | insol | insol | insol | insol | insol | insol |
| 7-day Solubility | ppt | ppt | insol | insol | insol | insol | insol | insol |
| Days soluble | 1 | 1 | — | — | — | — | — | — |

TABLE 17

|  | Ex. 98 | Ex. 99 | Ex. 100 | Ex. 101 | Ex. 102 | Ex. 103 | Ex. 104 | Ex. 105 |
|---|---|---|---|---|---|---|---|---|
| PPE 0.09 bifxl. (wt %) | 20 | 25 | 30 | 40 | 45 | 50 | 60 | 70 |
| PPE 0.09 bifxl. (g) | 8.46 | 10.58 | 12.69 | 16.92 | 19.03 | 21.15 | 25.38 | 29.61 |
| DMF (g) | 33.84 | 31.72 | 29.61 | 25.38 | 23.26 | 21.15 | 16.92 | 12.69 |
| Initial solubility | sol | sol | sol | sol | sol | sol | sol | sol |
| 7-day Solubility | sol | sol | sol | sol | sol | sol | ppt | ppt |
| Days soluble | — | — | — | — | — | — | 1 | 1 |

TABLE 18

|  | Ex. 106 | Ex. 107 | Ex. 108 | Ex. 109 | Ex. 110 | Ex. 111 | Ex. 112 | Ex. 113 |
|---|---|---|---|---|---|---|---|---|
| PPE 0.06 bifxl. (wt %) | 20 | 25 | 30 | 40 | 45 | 50 | 60 | 70 |
| PPE 0.06 bifxl. (g) | 8.46 | 10.58 | 12.69 | 16.92 | 19.03 | 21.15 | 25.38 | 29.61 |
| DMF (g) | 33.84 | 31.72 | 29.61 | 25.38 | 23.26 | 21.15 | 16.92 | 12.69 |
| Initial solubility | sol | sol | sol | sol | sol | sol | sol | sol |
| 7-day Solubility | sol | sol | sol | sol | sol | sol | sol | ppt |
| Days soluble | — | — | — | — | — | — | — | 1 |

As shown in Table 15, the monofunctional 0.12 dL/g poly (arylene ether) did not completely dissolve in DMF when it was present at 20 to 70 weight percent. In contrast, the bifunctional 0.12 dL/g poly(arylene ether) was soluble in DMF at concentrations up to 25 weight percent as shown by Examples 90 and 91 in Table 16. And, as shown by Examples 98-113 in Tables 17 and 18, the bifunctional 0.06 and 0.09 dL/g poly (arylene ether)s were initially soluble in DMF at concentrations up to 70 weight percent. The DMF solutions of the bifunctional 0.09 dL/g poly(arylene ether) remained homogenous after seven days at concentrations up to 50 weight percent, while DMF solutions of PPE 0.06 bifxl. remained homogeneous after seven days at concentrations up to 60 weight percent.

It can be seen from the above examples that the low intrinsic viscosity bifunctional poly(arylene ether)s exhibit substantially and surprisingly improved solubilities relative to monofunctional poly(arylene ether)s.

EXAMPLES 114-145

These examples illustrate that the high solubility of the bifunctional poly(arylene ether)s extends to temperatures substantially below room temperature.

The bifunctional poly(arylene ether) used in these experiments was a copolymer prepared by oxidative copolymerization of 2,6-dimethylphenol and 2,2-bis(3,5-dimethyl-4-hydroxyphenyl)propane. The bifunctional poly(arylene ether) had an intrinsic viscosity of 0.09 deciliter per gram. It is designated "PPE 0.09 bifxl." in Table 19.

Solutions of the bifunctional poly(arylene ether) at 10, 20, 30, and 40 weight percent in toluene, methyl ethyl ketone (MEK), and methyl isobutyl ketone (MIK) were prepared. The solutions were placed in a freezer having a temperature of 0-2° C. and each day for seven days they were monitored visually as described above. Samples were prepared as day zero, and day 1 represents 24 hour aging. (On day 1, the freezer had an observed temperature of 0° C.; on days 2-7, the freezer had an observed temperature of 2° C.)

The results for 2° C. and –10° C. aging of toluene solutions of the 0.09 dL/g bifunctional poly(arylene ether), presented in Tables 19 and 20 respectively, show that this bifunctional poly(arylene ether) is soluble at concentrations of up to 40 weight percent for at least 7 days at 2° C. and –10° C.

The results for 2° C. and –10° C. aging of methyl ethyl ketone solutions of the 0.09 dL/g bifunctional poly(arylene ether), presented in Tables 21 and 22 respectively, show that this bifunctional poly(arylene ether) was initially soluble in methyl ethyl ketone at 23° C. but insoluble at 2° C. and –10° C.

The results for the 0.06 dL/g bifunctional poly(arylene ether) solubility in toluene and methyl isobutyl ketone are presented in Tables 23-26. Tables 23 and 24 present toluene solubility data at 2 and –10° C., respectively. The 0.06 dL/g bifunctional poly(arylene ether) is soluble at concentrations of up to 40 weight percent for at least 7 days at 2 and –10° C. Tables 25 and 26 present methyl isobutyl ketone solubility data at 2 and –10° C., respectively. The 0.06 dL/g bifunctional poly(arylene ether) is soluble at concentrations of up to 40 weight percent for at least 7 days at 2 and –10° C.

TABLE 19

|  | Ex. 114 | Ex. 115 | Ex. 116 | Ex. 117 |
|---|---|---|---|---|
| PPE 0.09 bifxl. (wt %) | 10 | 20 | 30 | 40 |
| PPE 0.09 bifxl. (g) | 3 | 6 | 9 | 12 |
| Toluene (g) | 27 | 24 | 21 | 18 |
| Initial Solubility at 23° C. | sol. | sol. | sol. | sol. |
| 1-Day solubility at 0° C. | sol. | sol. | sol. | sol. |

TABLE 19-continued

|  | Ex. 114 | Ex. 115 | Ex. 116 | Ex. 117 |
|---|---|---|---|---|
| 2-Day solubility at 2° C. | sol. | sol. | sol. | sol. |
| 3-Day solubility at 2° C. | sol. | sol. | sol. | sol. |
| 4-Day solubility at 2° C. | sol. | sol. | sol. | sol. |
| 5-Day solubility at 2° C. | sol. | sol. | sol. | sol. |
| 6-Day solubility at 2° C. | sol. | sol. | sol. | sol. |
| 7-Day solubility at 2° C. | sol. | sol. | sol. | sol. |

TABLE 20

|  | Ex. 118 | Ex. 119 | Ex. 120 | Ex. 121 |
|---|---|---|---|---|
| PPE 0.09 bifxl. (wt %) | 10 | 20 | 30 | 40 |
| PPE 0.09 bifxl. (g) | 3 | 6 | 9 | 12 |
| Toluene (g) | 27 | 24 | 21 | 18 |
| Initial Solubility at 23° C. | sol. | sol. | sol. | sol. |
| 1-Day solubility at –10° C. | sol. | sol. | sol. | sol. |
| 2-Day solubility at –10° C. | sol. | sol. | sol. | sol. |
| 3-Day solubility at –10° C. | sol. | sol. | sol. | sol. |
| 4-Day solubility at –10° C. | sol. | sol. | sol. | sol. |
| 5-Day solubility at –10° C. | sol. | sol. | sol. | sol. |
| 6-Day solubility at –10° C. | sol. | sol. | sol. | sol. |
| 7-Day solubility at –10° C. | sol. | sol. | sol. | sol. |

TABLE 21

|  | Ex. 122 | Ex. 123 | Ex. 124 | Ex. 125 |
|---|---|---|---|---|
| PPE 0.09 bifxl. (wt %) | 10 | 20 | 30 | 40 |
| PPE 0.09 bifxl. (g) | 3 | 6 | 9 | 12 |
| MEK (g) | 27 | 24 | 21 | 18 |
| Initial Solubility at 23° C. | sol. | sol. | sol. | sol. |
| 1-Day solubility at 0° C. | ppt. | ppt. | ppt. | ppt. |
| 2-Day solubility at 2° C. | ppt. | ppt. | ppt. | ppt. |
| 3-Day solubility at 2° C. | ppt. | ppt. | ppt. | ppt. |
| 4-Day solubility at 2° C. | ppt. | ppt. | ppt. | ppt. |
| 5-Day solubility at 2° C. | ppt. | ppt. | ppt. | ppt. |
| 6-Day solubility at 2° C. | ppt. | ppt. | ppt. | ppt. |
| 7-Day solubility at 2° C. | ppt. | ppt. | ppt. | ppt. |

TABLE 22

|  | Ex. 126 | Ex. 127 | Ex. 128 | Ex. 129 |
|---|---|---|---|---|
| PPE 0.09 bifxl. (wt %) | 10 | 20 | 30 | 40 |
| PPE 0.09 bifxl. (g) | 3 | 6 | 9 | 12 |
| MEK (g) | 27 | 24 | 21 | 18 |
| Initial Solubility at 23° C. | sol. | sol. | sol. | sol. |
| 1-Day solubility at –10° C. | ppt. | ppt. | ppt. | ppt. |
| 2-Day solubility at –10° C. | ppt. | ppt. | ppt. | ppt. |
| 3-Day solubility at –10° C. | ppt. | ppt. | ppt. | ppt. |
| 4-Day solubility at –10° C. | ppt. | ppt. | ppt. | ppt. |
| 5-Day solubility at –10° C. | ppt. | ppt. | ppt. | ppt. |
| 6-Day solubility at –10° C. | ppt. | ppt. | ppt. | ppt. |
| 7-Day solubility at –10° C. | ppt. | ppt. | ppt. | ppt. |

TABLE 23

|  | Ex. 130 | Ex. 131 | Ex. 132 | Ex. 133 |
|---|---|---|---|---|
| PPE 0.06 bifxl. (wt %) | 10 | 20 | 30 | 40 |
| PPE 0.06 bifxl. (g) | 3 | 6 | 9 | 12 |
| Toluene (g) | 27 | 24 | 21 | 18 |
| Initial Solubility at 23° C. | sol. | sol. | sol. | sol. |
| 1-Day solubility at 0° C. | sol. | sol. | sol. | sol. |
| 2-Day solubility at 2° C. | sol. | sol. | sol. | sol. |
| 3-Day solubility at 2° C. | sol. | sol. | sol. | sol. |
| 4-Day solubility at 2° C. | sol. | sol. | sol. | sol. |
| 5-Day solubility at 2° C. | sol. | sol. | sol. | sol. |

TABLE 23-continued

|  | Ex. 130 | Ex. 131 | Ex. 132 | Ex. 133 |
|---|---|---|---|---|
| 6-Day solubility at 2° C. | sol. | sol. | sol. | sol. |
| 7-Day solubility at 2° C. | sol. | sol. | sol. | sol. |

TABLE 24

|  | Ex. 134 | Ex. 135 | Ex. 136 | Ex. 137 |
|---|---|---|---|---|
| PPE 0.06 bifxl. (wt %) | 10 | 20 | 30 | 40 |
| PPE 0.06 bifxl. (g) | 3 | 6 | 9 | 12 |
| Toluene (g) | 27 | 24 | 21 | 18 |
| Initial Solubility at 23° C. | sol. | sol. | sol. | sol. |
| 1-Day solubility at −10° C. | sol. | sol. | sol. | sol. |
| 2-Day solubility at −10° C. | sol. | sol. | sol. | sol. |
| 3-Day solubility at −10° C. | sol. | sol. | sol. | sol. |
| 4-Day solubility at −10° C. | sol. | sol. | sol. | sol. |
| 5-Day solubility at −10° C. | sol. | sol. | sol. | sol. |
| 6-Day solubility at −10° C. | sol. | sol. | sol. | sol. |
| 7-Day solubility at −10° C. | sol. | sol. | sol. | sol. |
| Days Soluble | 7 | 7 | 7 | 7 |

TABLE 25

|  | Ex. 138 | Ex. 139 | Ex. 140 | Ex. 141 |
|---|---|---|---|---|
| PPE 0.06 bifxl. (wt %) | 10 | 20 | 30 | 40 |
| PPE 0.06 bifxl. (g) | 3 | 6 | 9 | 12 |
| MEK (g) | 27 | 24 | 21 | 18 |
| Initial Solubility at 23° C. | sol. | sol. | sol. | sol. |
| 1-Day solubility at 2° C. | sol. | sol. | sol. | sol. |
| 2-Day solubility at 2° C. | sol. | sol. | sol. | sol. |
| 3-Day solubility at 2° C. | sol. | sol. | sol. | sol. |
| 4-Day solubility at 2° C. | sol. | sol. | sol. | sol. |
| 5-Day solubility at 2° C. | sol. | sol. | sol. | sol. |
| 6-Day solubility at 2° C. | sol. | sol. | sol. | sol. |
| 7-Day solubility at 2° C. | sol. | sol. | sol. | sol. |
| Days Soluble | 7 | 7 | 7 | 7 |

TABLE 26

|  | Ex. 142 | Ex. 143 | Ex. 144 | Ex. 145 |
|---|---|---|---|---|
| PPE 0.06 bifxl. (wt %) | 10 | 20 | 30 | 40 |
| PPE 0.06 bifxl. (g) | 3 | 6 | 9 | 12 |
| MEK (g) | 27 | 24 | 21 | 18 |
| Initial Solubility at 23° C. | sol. | sol. | sol. | sol. |
| 1-Day solubility at −10° C. | sol. | sol. | sol. | sol. |
| 2-Day solubility at −10° C. | sol. | sol. | sol. | sol. |
| 3-Day solubility at −10° C. | sol. | sol. | sol. | sol. |
| 4-Day solubility at −10° C. | sol. | sol. | sol. | sol. |
| 5-Day solubility at −10° C. | sol. | sol. | sol. | sol. |
| 6-Day solubility at −10° C. | sol. | sol. | sol. | sol. |
| 7-Day solubility at −10° C. | sol. | sol. | sol. | sol. |
| Days Soluble | 7 | 7 | 7 | 7 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition, comprising:
   at least 15 weight percent of a bifunctional poly(arylene ether) having an intrinsic viscosity of about 0.03 to 0.12 deciliter per gram measured in chloroform at 25° C.; wherein the bifunctional poly(arylene ether) has the structure

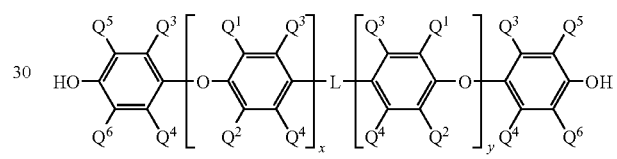

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30 with the proviso that the sum of x and y is at least 2; and L has the structure

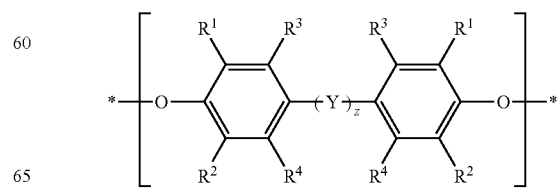

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

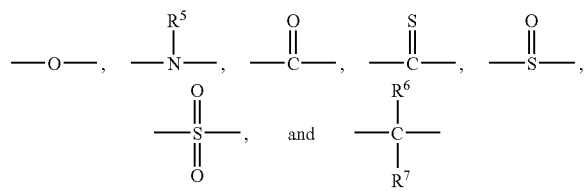

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and at least 20 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof;

wherein the bifunctional poly(arylene ether) has a solubility in the composition of at least 100 grams per kilogram of composition at 23° C.;

wherein the composition is substantially free of $C_1$-$C_6$ alkanols, alkali metal ions, and metal ions effective for the catalysis of oxidative polymerization of phenols; and wherein all weight percents are based on the total weight of the composition.

2. The composition of claim 1, wherein the bifunctional poly(arylene ether) has a solubility in the composition of 100 to about 700 grams per kilogram of composition at 23° C.

3. The composition of claim 1, wherein the bifunctional poly(arylene ether) is soluble in the composition for one day at 23° C.

4. The composition of claim 1, wherein the bifunctional poly(arylene ether) is soluble in the composition for two days at 23° C.

5. The composition of claim 1, wherein the bifunctional poly(arylene ether) is soluble in the composition for seven days at 23° C.

6. The composition of claim 1, wherein the bifunctional poly(arylene ether) has a 23° C. solubility in the solvent of at least 15 weight percent based on the total weight of the bifunctional poly(arylene ether) and the solvent.

7. The composition of claim 1, wherein the bifunctional poly(arylene ether) has a one-day 23° C. solubility in the solvent of at least 15 weight percent based on the total weight of the bifunctional poly(arylene ether) and the solvent.

8. The composition of claim 1, wherein the bifunctional poly(arylene ether) has a two-day 23° C. solubility in the solvent of at least 15 weight percent based on the total weight of the bifunctional poly(arylene ether) and the solvent.

9. The composition of claim 1, wherein the bifunctional poly(arylene ether) has a seven-day 23° C. solubility in the solvent of at least 15 weight percent based on the total weight of the bifunctional poly(arylene ether) and the solvent.

10. The composition of claim 1, wherein the bifunctional poly(arylene ether) has a 2° C. solubility in the solvent of at least 15 weight percent based on the total weight of the bifunctional poly(arylene ether) and the solvent.

11. The composition of claim 1, wherein the bifunctional poly(arylene ether) has a one-day 2° C. solubility in the solvent of at least 15 weight percent based on the total weight of the bifunctional poly(arylene ether) and the solvent.

12. The composition of claim 1, wherein the bifunctional poly(arylene ether) has a two-day 2° C. solubility in the solvent of at least 15 weight percent based on the total weight of the bifunctional poly(arylene ether) and the solvent.

13. The composition of claim 1, wherein the bifunctional poly(arylene ether) has a seven-day 2° C. solubility in the solvent of at least 15 weight percent based on the total weight of the bifunctional poly(arylene ether) and the solvent.

14. The composition of claim 1, wherein the bifunctional poly(arylene ether) has a −10° C. solubility in the solvent of at least 15 weight percent based on the total weight of the bifunctional poly(arylene ether) and the solvent.

15. The composition of claim 1, wherein the bifunctional poly(arylene ether) has a one-day −10° C. solubility in the solvent of at least 15 weight percent based on the total weight of the bifunctional poly(arylene ether) and the solvent.

16. The composition of claim 1, wherein the bifunctional poly(arylene ether) has a two-day −10° C. solubility in the solvent of at least 15 weight percent based on the total weight of the bifunctional poly(arylene ether) and the solvent.

17. The composition of claim 1, wherein the bifunctional poly(arylene ether) has a seven-day −10° C. solubility in the solvent of at least 15 weight percent based on the total weight of the bifunctional poly(arylene ether) and the solvent.

18. The composition of claim 1, having a viscosity less than or equal to 2000 centipoise at 23° C.

19. The composition of claim 1, comprising about 40 to about 80 weight percent of the bifunctional poly(arylene ether) and about 20 to about 60 weight percent of the solvent.

20. The composition of claim 1, consisting of about 40 to about 80 weight percent of the bifunctional poly(arylene ether) and about 20 to about 60 weight percent of the solvent.

21. The composition of claim 1, wherein the bifunctional poly(arylene ether) has the structure

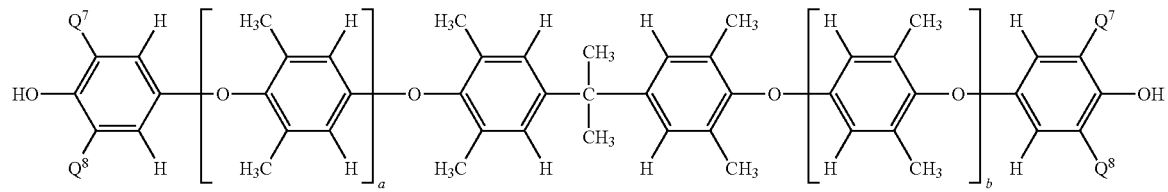

wherein each occurrence of $Q^7$ and $Q^8$ is independently methyl or di-n-butylaminomethyl; and each occurrence of a and b is independently 1 to about 20, with the proviso that the sum of a and b is at least 2.

22. The composition of claim 1, wherein the solvent is a $C_3$-$C_8$ ketone.

23. The composition of claim 1, wherein the solvent is methyl ethyl ketone.

24. The composition of claim 1, wherein the solvent is methyl ethyl ketone and the a bifunctional poly(arylene ether) is a copolymer of 2,6-dimethylphenol and 2,2-bis(3,5-dimethyl-4-hydroxyphenol)propane having an intrinsic viscosity of 0.05 to 0.07 deciliter per gram measured in chloroform at 25° C.

25. The composition of claim 1, wherein the solvent is methyl isobutyl ketone.

26. The composition of claim 1, wherein the solvent is a $C_4$-$C_8$ N,N-dialkylamide.

27. The composition of claim 1, wherein the solvent comprises N-methyl-2-pyrrolidone.

28. The composition of claim 1, wherein the solvent comprises a $C_4$-$C_{16}$ dialkyl ether.

29. The composition of claim 1, wherein the solvent is ethylene glycol monomethyl ether.

30. The composition of claim 1, wherein the solvent comprises a $C_3$-$C_6$ alkyl alkanoate.

31. The composition of claim 1, wherein the solvent is ethyl acetate.

32. The composition of claim 1, wherein the solvent comprises a $C_2$-$C_6$ alkyl cyanide.

33. The composition of claim 1, wherein the solvent is acetonitrile.

34. The composition of claim 1, wherein the composition is substantially free of any polymer other than a poly(arylene ether).

35. The composition of claim 1, wherein the composition is substantially free of halide ions.

36. The composition of claim 1, wherein the composition is substantially free of nitrogen-containing ligands effective for the oxidative polymerization of phenols.

37. The composition of claim 1, wherein the composition is substantially free of thermoset resin.

38. A composition, consisting of:
15 to about 80 weight percent of a bifunctional poly(arylene ether) having an intrinsic viscosity of about 0.03 to 0.12 deciliter per gram measured in chloroform at 25° C.; wherein the bifunctional poly(arylene ether) has the structure

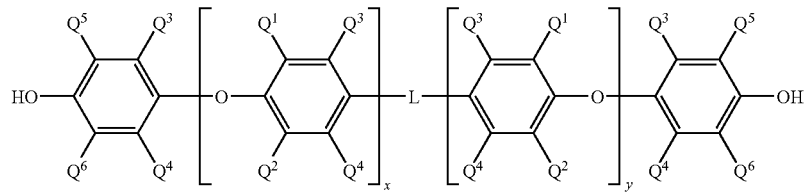

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^5$ and $Q^6$ is independently selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30 with the proviso that the sum of x and y is at least 2; and L has the structure

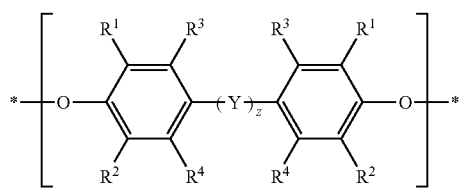

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

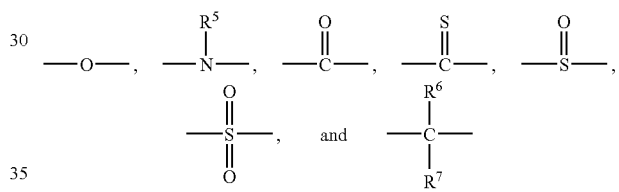

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and about 20 to 85 weight percent of a solvent selected from the group consisting of $C_3$-$C_8$ ketones, $C_4$-$C_8$ N,N-dialkylamides, $C_4$-$C_{16}$ dialkyl ethers, $C_3$-$C_6$ alkyl alkanoates, $C_2$-$C_6$ alkyl cyanides, and mixtures thereof;

wherein the bifunctional poly(arylene ether) has a solubility in the composition of at least 100 grams per kilogram of composition at 23° C.;

wherein the composition is substantially free of $C_1$-$C_6$ alkanols, alkali metal ions, and metal ions effective for the catalysis of oxidative polymerization of phenols; and wherein all weight percents are based on the total weight of the composition.

39. A composition, comprising:
about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

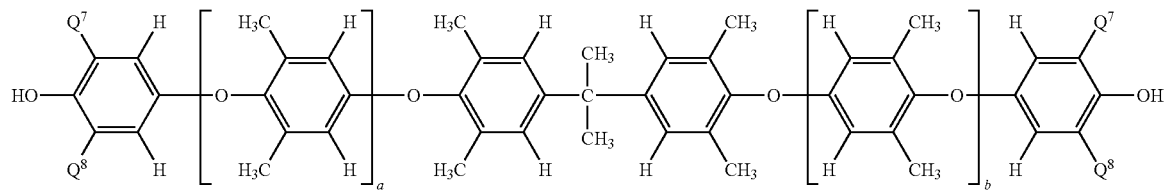

wherein each occurrence of $Q^7$ and $Q^8$ is independently methyl or di-n-butylaminomethyl; and each occurrence of a and b is independently 1 to about 20, with the proviso that the sum of a and b is at least 2; and about 40 to about 70 weight percent of a solvent selected from the group consisting of methyl ethyl ketone, methyl isobutyl ketone, N,N-dimethylformamide, N-methylpyrrolidone, and mixtures thereof;

wherein the bifunctional poly(arylene ether) is soluble in the composition at 23° C. for seven days; and wherein all weight percents are based on the total weight of the composition.

40. The composition of claim 39, wherein the solvent is methyl isobutyl ketone.

41. A composition, consisting of:

about 30 to about 60 weight percent of a bifunctional poly(arylene ether) having an intrinsic viscosity of about 0.03 to about 0.09 deciliter per gram measured in chloroform at 25° C., wherein the bifunctional poly(arylene ether) has the structure

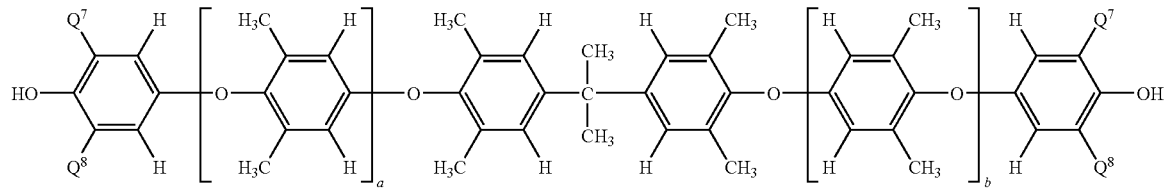

wherein each occurrence of $Q^7$ and $Q^8$ is independently methyl or di-n-butylaminomethyl; and each occurrence of a and b is independently 1 to about 20, with the proviso that the sum of a and b is at least 2; and about 40 to about 70 weight percent of a solvent selected from the group consisting of methyl ethyl ketone, methyl isobutyl ketone, N,N-dimethylformamide, N-methylpyrrolidone, and mixtures thereof;

wherein the bifunctional poly(arylene ether) is soluble in the composition at 23° C. for seven days; and wherein all weight percents are based on the total weight of the composition.

42. The composition of claim 41, wherein the solvent is methyl isobutyl ketone.

* * * * *

UNITED STATES PATENT AND TRADEMARK OFFICE
CERTIFICATE OF CORRECTION

PATENT NO. : 7,638,566 B2 Page 1 of 1
APPLICATION NO. : 11/554246
DATED : December 29, 2009
INVENTOR(S) : Braidwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Ninth Day of November, 2010

David J. Kappos
*Director of the United States Patent and Trademark Office*